(12) United States Patent
Nagano et al.

(10) Patent No.: US 10,560,638 B2
(45) Date of Patent: Feb. 11, 2020

(54) IMAGING APPARATUS AND IMAGING METHOD

(71) Applicant: SONY SEMICONDUCTOR SOLUTIONS CORPORATION, Kanagawa (JP)

(72) Inventors: Hirosuke Nagano, Kanagawa (JP); Yasushi Sato, Kanagawa (JP)

(73) Assignee: SONY SEMICONDUCTOR SOLUTIONS CORPORATION, Kanagawa (JP)

( * ) Notice: Subject to any disclaimer, the term of this patent is extended or adjusted under 35 U.S.C. 154(b) by 0 days.

(21) Appl. No.: 15/764,384

(22) PCT Filed: Nov. 2, 2016

(86) PCT No.: PCT/JP2016/082532
§ 371 (c)(1),
(2) Date: Mar. 29, 2018

(87) PCT Pub. No.: WO2017/086155
PCT Pub. Date: May 26, 2017

(65) Prior Publication Data
US 2018/0284576 A1    Oct. 4, 2018

(30) Foreign Application Priority Data

Nov. 17, 2015 (JP) .................... 2015-224924

(51) Int. Cl.
*H04N 5/235* (2006.01)
*H04N 5/33* (2006.01)
(Continued)

(52) U.S. Cl.
CPC .......... *H04N 5/2354* (2013.01); *G03B 15/03* (2013.01); *H04N 5/238* (2013.01); *H04N 5/33* (2013.01);
(Continued)

(58) Field of Classification Search
CPC .. H04N 5/22546; H04N 5/2354; H04N 5/238; H04N 5/33; H04N 9/045;
(Continued)

(56) References Cited

U.S. PATENT DOCUMENTS 9,667,933 B2 * 5/2017 Wu .................. H01L 27/14621
2013/0002882 A1 * 1/2013 Onozawa ............. H04N 5/2353
348/164

FOREIGN PATENT DOCUMENTS

JP       2011-233983 A    11/2011
JP       2014-207493 A    10/2014
(Continued)

OTHER PUBLICATIONS

International Search Report and Written Opinion of PCT Application No. PCT/JP2016/082532, dated Jan. 24, 2017, 06 pages of ISRWO.

*Primary Examiner* — Lin Ye
*Assistant Examiner* — Chriss S Yoder, III
(74) *Attorney, Agent, or Firm* — Chip Law Group

(57) ABSTRACT

The present technology relates to an imaging apparatus, an imaging method, and a program capable of obtaining a color image even in a case where photographing is performed in a dark place. The apparatus includes: an infrared light emission unit that emits infrared light; a sensor array in which a plurality of pixels is arranged, the plurality of pixels including a first pixel that includes a period during which the infrared light is emitted by the infrared light emission unit as an exposure duration, a second pixel that does not include a period during which the infrared light is emitted as the exposure duration, and an infrared light pixel that receives infrared light contained in ambient light; an acquisition unit that obtains an infrared light image captured by the first pixel, a visible image captured by the second pixel, and an ambient infrared light image captured by the infrared light
(Continued)

pixel; and an image generation unit that generates an image as a result of removing the infrared light contained in the ambient light from the infrared light image and the visible image using the ambient infrared light image. The present technology is applicable to a surveillance camera, for example.

11 Claims, 13 Drawing Sheets

(51) Int. Cl.
*H04N 5/238* (2006.01)
*H04N 9/07* (2006.01)
*G03B 15/03* (2006.01)
*H04N 9/04* (2006.01)
*H04N 5/225* (2006.01)

(52) U.S. Cl.
CPC ............... *H04N 9/045* (2013.01); *H04N 9/07* (2013.01); *H04N 5/2256* (2013.01)

(58) Field of Classification Search
CPC .. H04N 9/04553; H04N 9/04555; H04N 9/07; G03B 15/03
See application file for complete search history.

(56) References Cited

FOREIGN PATENT DOCUMENTS

| JP | 2015-053578 A | 3/2015 |
|---|---|---|
| WO | 2013/027340 A1 | 2/2013 |

\* cited by examiner

FIG. 6

|    | 1 | 2 | 3 | 4 | 5 | 6 | 7 | 8 | 9 | 10 | 11 | 12 | 13 | 14 | 15 | 16 |
|----|---|---|---|---|---|---|---|---|---|----|----|----|----|----|----|----|
| 1  | R | W | B | W | R | W | B | W | R | W  | B  | W  | R  | W  | B  | W  |
| 2  | W | G | W | G | W | G | W | G | W | G  | W  | G  | W  | G  | W  | G  |
| 3  | B | W | R | W | B | W | R | W | B | W  | R  | W  | B  | W  | R  | W  |
| 4  | W | G | W | G | W | G | W | G | W | G  | W  | G  | W  | G  | W  | G  |
| 5  | R | W | B | W | R | W | B | W | R | W  | B  | W  | R  | W  | B  | W  |
| 6  | W | G | W | G | W | G | W | G | W | G  | W  | G  | W  | G  | W  | G  |
| 7  | B | W | R | W | B | W | R | W | B | W  | R  | W  | B  | W  | R  | W  |
| 8  | W | G | W | G | W | G | W | G | W | G  | W  | G  | W  | G  | W  | G  |
| 9  | R | W | B | W | R | W | ■ | W | R | W  | B  | W  | R  | W  | B  | W  |
| 10 | W | G | W | G | W | G | W | G | W | G  | W  | G  | W  | G  | W  | G  |
| 11 | B | W | R | W | B | W | R | W | B | W  | R  | W  | B  | W  | R  | W  |
| 12 | W | G | W | G | W | G | W | ■ | W | G  | W  | G  | W  | G  | W  | G  |
| 13 | R | W | B | W | R | W | B | W | R | W  | B  | W  | R  | W  | B  | W  |
| 14 | W | G | W | G | W | G | W | G | W | G  | W  | G  | W  | G  | W  | G  |
| 15 | B | W | R | W | B | W | R | W | B | W  | R  | W  | B  | W  | R  | W  |
| 16 | W | G | W | G | W | G | W | G | W | G  | W  | G  | W  | G  | W  | G  |

*FIG. 10*

|    | 1 | 2 | 3 | 4 | 5 | 6 | 7 | 8 | 9 | 10 | 11 | 12 | 13 | 14 | 15 | 16 |
|----|---|---|---|---|---|---|---|---|---|----|----|----|----|----|----|----|
| 1  | R | W | B | W | R | W | B | W | R | W  | B  | W  | R  | W  | B  | W  |
| 2  | W |   | W | G | W |   | W | G | W |    | W  | G  | W  |    | W  | G  |
| 3  | B | W | R | W | B | W | R | W | B | W  | R  | W  | B  | W  | R  | W  |
| 4  | W | G | W |   | W | G | W |   | W | G  | W  |    | W  | G  | W  |    |
| 5  | R | W | B | W | R | W | B | W | R | W  | B  | W  | R  | W  | B  | W  |
| 6  | W |   | W | G | W |   | W | G | W |    | W  | G  | W  |    | W  | G  |
| 7  | B | W | R | W | B | W | R | W | B | W  | R  | W  | B  | W  | R  | W  |
| 8  | W | G | W |   | W | G | W |   | W | G  | W  |    | W  | G  | W  |    |
| 9  | R | W | B | W | R | W | B | W | R | W  | B  | W  | R  | W  | B  | W  |
| 10 | W |   | W | G | W |   | W | G | W |    | W  | G  | W  |    | W  | G  |
| 11 | B | W | R | W | B | W | R | W | B | W  | R  | W  | B  | W  | R  | W  |
| 12 | W | G | W |   | W | G | W |   | W | G  | W  |    | W  | G  | W  |    |
| 13 | R | W | B | W | R | W | B | W | R | W  | B  | W  | R  | W  | B  | W  |
| 14 | W |   | W | G | W |   | W | G | W |    | W  | G  | W  |    | W  | G  |
| 15 | B | W | R | W | B | W | R | W | B | W  | R  | W  | B  | W  | R  | W  |
| 16 | W | G | W |   | W | G | W |   | W | G  | W  |    | W  | G  | W  |    |

FIG. 11

|    | 1 | 2 | 3 | 4 | 5 | 6 | 7 | 8 | 9 | 10 | 11 | 12 | 13 | 14 | 15 | 16 |
|----|---|---|---|---|---|---|---|---|---|----|----|----|----|----|----|----|
| 1  | R | W | B | W | R | W | B | W | R | W  | B  | W  | R  | W  | B  | W  |
| 2  |   | G |   | G |   | G |   | G |   | G  |    | G  |    | G  |    | G  |
| 3  | B | W | R | W | B | W | R | W | B | W  | R  | W  | B  | W  | R  | W  |
| 4  |   | G |   | G |   | G |   | G |   | G  |    | G  |    | G  |    | G  |
| 5  | R | W | B | W | R | W | B | W | R | W  | B  | W  | R  | W  | B  | W  |
| 6  |   | G |   | G |   | G |   | G |   | G  |    | G  |    | G  |    | G  |
| 7  | B | W | R | W | B | W | R | W | B | W  | R  | W  | B  | W  | R  | W  |
| 8  |   | G |   | G |   | G |   | G |   | G  |    | G  |    | G  |    | G  |
| 9  | R | W | B | W | R | W | B | W | R | W  | B  | W  | R  | W  | B  | W  |
| 10 |   | G |   | G |   | G |   | G |   | G  |    | G  |    | G  |    | G  |
| 11 | B | W | R | W | B | W | R | W | B | W  | R  | W  | B  | W  | R  | W  |
| 12 |   | G |   | G |   | G |   | G |   | G  |    | G  |    | G  |    | G  |
| 13 | R | W | B | W | R | W | B | W | R | W  | B  | W  | R  | W  | B  | W  |
| 14 |   | G |   | G |   | G |   | G |   | G  |    | G  |    | G  |    | G  |
| 15 | B | W | R | W | B | W | R | W | B | W  | R  | W  | B  | W  | R  | W  |
| 16 |   | G |   | G |   | G |   | G |   | G  |    | G  |    | G  |    | G  |

IMAGING APPARATUS AND IMAGING METHOD

CROSS REFERENCE TO RELATED APPLICATIONS

This application is a U.S. National Phase of International Patent Application No. PCT/JP2016/082532 filed on Nov. 2, 2016, which claims priority benefit of Japanese Patent Application No. JP 2015-224924 filed in the Japan Patent Office on Nov. 17, 2015. Each of the above-referenced applications is hereby incorporated herein by reference in its entirety.

TECHNICAL FIELD

The present technology relates to an imaging apparatus, an imaging method, and a program. Specifically, the present technology relates to an imaging apparatus, an imaging method, and a program capable of generating a color image and enabling imaging with enhanced image quality even in a case where an infrared image captured by emission of infrared light is used.

BACKGROUND ART

Conventionally, for example, a certain surveillance camera has two types of modes, a day mode of imaging under illumination of visible light such as natural light in daytime or white light, and a night mode of imaging with emission of the infrared light.

The imaging in the day mode can obtain color images. In contrast, reflected infrared light reflected by a subject is received in the imaging in the night mode, in which solely the light reception intensity of the reflected light (infrared light) can be obtained and color information such as R, B, and G cannot be obtained. Accordingly, the obtained image is a monochrome image of gray, green, or the like.

It is desirable, however, that a color image can be obtained even in the night mode imaging. Conventionally, various methods have been proposed for generating a color image on the basis of an image obtained by imaging a state in which infrared light is emitted toward an imaging range (subject) (hereinafter referred to as an infrared image).

For example, Patent Document 1 discloses a technique of consecutively capturing an infrared image in a state where the infrared light is emitted and a visible image under low illuminance with no emission of the infrared light so as to generate a color image using the captured images.

CITATION LIST

Patent Document

Patent Document 1: Japanese Patent Application Laid-Open No. 2011-233983

SUMMARY OF THE INVENTION

Problems to be Solved by the Invention

Patent Document 1 describes a case where an infrared image captured in a state where infrared light is emitted and a visible image under low illuminance with no emission of infrared light are consecutively captured, leading to the frame rate to be output being about ½ the captured frame rate. It is desired to be able to obtain a color image without decreasing the frame rate and even in the night mode imaging.

The present technology has been made in view of this situation, and aims to make it possible to obtain a color image and capture an image with enhanced image quality even in the use of the infrared light.

Solutions to Problems

An imaging apparatus according to an aspect of the present technology includes: an infrared light emission unit that emits infrared light; a sensor array in which a plurality of pixels is arranged, the plurality of pixels including a first pixel that includes a period during which the infrared light is emitted by the infrared light emission unit as an exposure duration, a second pixel that does not include a period during which the infrared light is emitted as the exposure duration, and an infrared light pixel that receives infrared light contained in ambient light; an acquisition unit that obtains an infrared light image captured by the first pixel, a visible image captured by the second pixel, and an ambient infrared light image captured by the infrared light pixel; and an image generation unit that generates an image as a result of removing the infrared light contained in the ambient light from the infrared light image and the visible image using the ambient infrared light image.

The first pixel can be a pixel having panchromatic spectral sensitivity and the second pixel can be a pixel having spectral sensitivity characteristic in a predetermined color.

Exposure control of the infrared light pixel can be the same as exposure control of the second pixel.

The infrared light pixels can be arranged discretely within the sensor array.

The infrared light pixels can be arranged regularly within the sensor array.

A portion of the first pixel can be the infrared light pixel.

The position of the infrared light pixel can be controlled by an address.

It is possible to perform correction of the infrared light pixel to a pixel value of a case where the infrared light pixel is one of the first pixel value and the second pixel, and the ambient infrared light image is subtracted from the corrected infrared light image and the visible image, leading to generation of an image from which infrared light contained in the ambient light has been removed.

The infrared light pixel can have a configuration in which an address is stored in a static defective pixel correction circuit and the correction can be performed by the static defective pixel correction circuit.

An imaging method according to an aspect of the present technology includes: emitting infrared light; from a sensor array in which a plurality of pixels is arranged, the plurality of pixels including a first pixel that includes a period during which the infrared light is emitted as an exposure duration, a second pixel that does not include a period during which the infrared light is emitted as the exposure duration, and an infrared light pixel that receives infrared light contained in ambient light, obtaining an infrared light image captured by the first pixel, a visible image captured by the second pixel, and an ambient infrared light image captured by the infrared light pixel; and generating an image as a result of removing the infrared light contained in the ambient light from the infrared light image and the visible image using the ambient infrared light image.

A program according to an aspect of the present technology is a program for causing a computer to execute processing including steps of: emitting infrared light; from a sensor array in which a plurality of pixels is arranged, the plurality of pixels including a first pixel that includes a period during which the infrared light is emitted as an exposure duration, a second pixel that does not include a period during which the infrared light is emitted as the exposure duration, and an infrared light pixel that receives infrared light contained in ambient light, obtaining an infrared light image captured by the first pixel, a visible image captured by the second pixel, and an ambient infrared light image captured by the infrared light pixel; and generating an image as a result of removing the infrared light contained in the ambient light from the infrared light image and the visible image using the ambient infrared light image.

With an imaging apparatus, an imaging method, and a program according to an aspect of the present technology, infrared light is emitted, and from a sensor array in which a plurality of pixels is arranged, the plurality of pixels including a first pixel that includes a period during which the infrared light is emitted by the infrared light emission unit as an exposure duration, a second pixel that does not include a period during which the infrared light is emitted as an exposure duration, and an infrared light pixel that receives infrared light contained in ambient light, an infrared light image captured by the first pixel, a visible image captured by the second pixel, and an ambient infrared light image captured by the infrared light pixel are obtained; and an image as a result of removing infrared light contained in the ambient light is generated from the infrared light image and the visible image using the ambient infrared light image.

Effects of the Invention

According to one aspect of the present technology, it is possible to obtain a color image and capture an image with enhanced image quality even in a case where the infrared light is used.

Note that effects described herein are non-restricting. The effects may be any effects described in the present disclosure.

BRIEF DESCRIPTION OF DRAWINGS

FIG. 6 is a diagram for illustrating pixel arrangement.

FIG. 10 is a view for illustrating another arrangement of infrared light pixels.

FIG. 11 is a diagram for illustrating another arrangement of the infrared light pixels.

MODE FOR CARRYING OUT THE INVENTION

Figure 1:
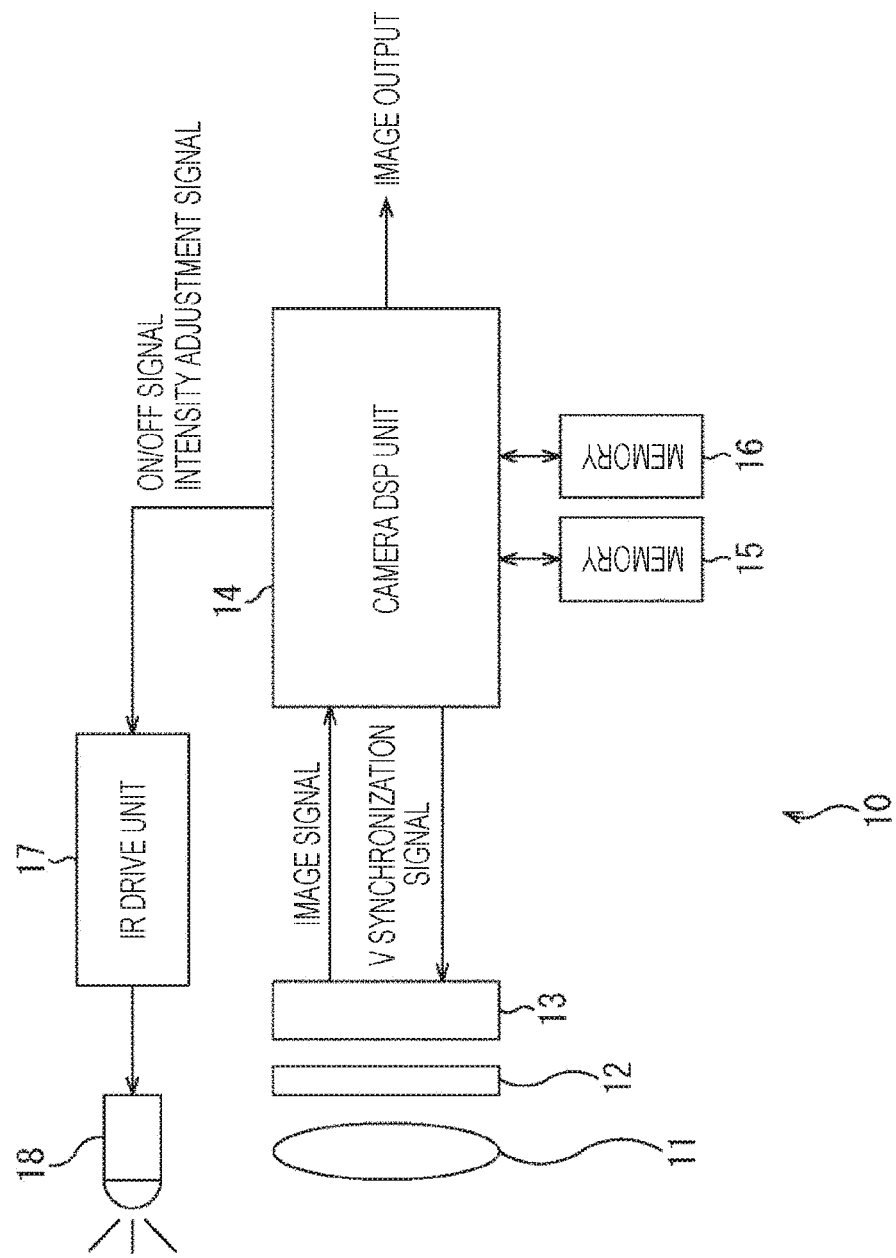
FIG. 1 is a block diagram illustrating an exemplary configuration of an imaging apparatus according to the present disclosure.

Hereinafter, embodiments of the present technology (hereinafter, embodiment(s)) will be described. Note that description will be presented in the following order.
1. Configuration of imaging apparatus
2. Configuration of camera DSP unit
3. Emission of infrared light
4. Processing of camera DSP unit
5. Another arrangement of infrared light pixels
6. Exemplary application of imaging apparatus
7. Recording medium <Configuration of Imaging Apparatus>

FIG. 1 illustrates an exemplary configuration of an imaging apparatus according to an embodiment of the present disclosure.

An imaging apparatus 10 is used in a surveillance camera, for example, to generate a color image on the basis of an infrared image obtained in a state where infrared light is emitted and a visible image obtained under low illuminance with no emission of the infrared light.

The imaging apparatus 10 includes an imaging system having a configuration similar to a general camera, an image processing system that executes image processing, and an irradiation system that emits infrared light toward an imaging range.

The imaging system of the imaging apparatus 10 includes a lens 11, an IR bandpass filter 12, and a CMOS image sensor 13 of a focal plane read system (rolling shutter system). In the imaging system, the lens 11 condenses an optical image of a subject onto the CMOS image sensor 13, then, the IR bandpass filter 12 arranged between the lens 11 and the CMOS image sensor 13 extracts a visible light component and an infrared light component from an optical image of the subject, and the CMOS image sensor 13 generates an image signal based on incident light and outputs the signal to the image processing system.

Figure 2:
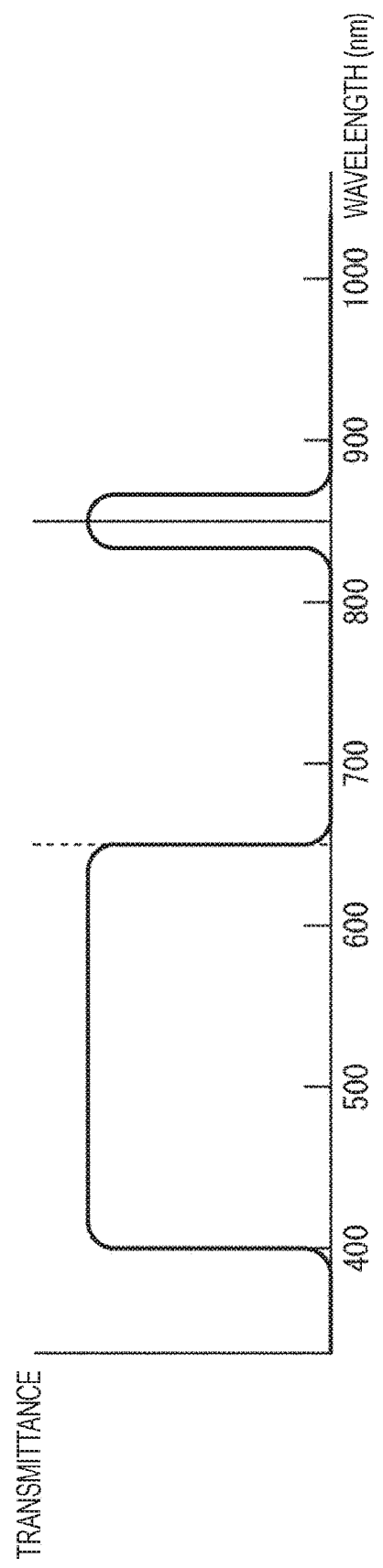
FIG. 2 is a diagram illustrating transmission characteristics of an IR bandpass filter.

FIG. 2 illustrates transmission characteristics of the IR bandpass filter 12. The IR bandpass filter 12 is defined as a filter having a high transmittance to visible light having a wavelength of 400 nm to 650 nm and infrared light having a peak wavelength at 850 nm (infrared light emitted by the irradiation system).

Figure 3:
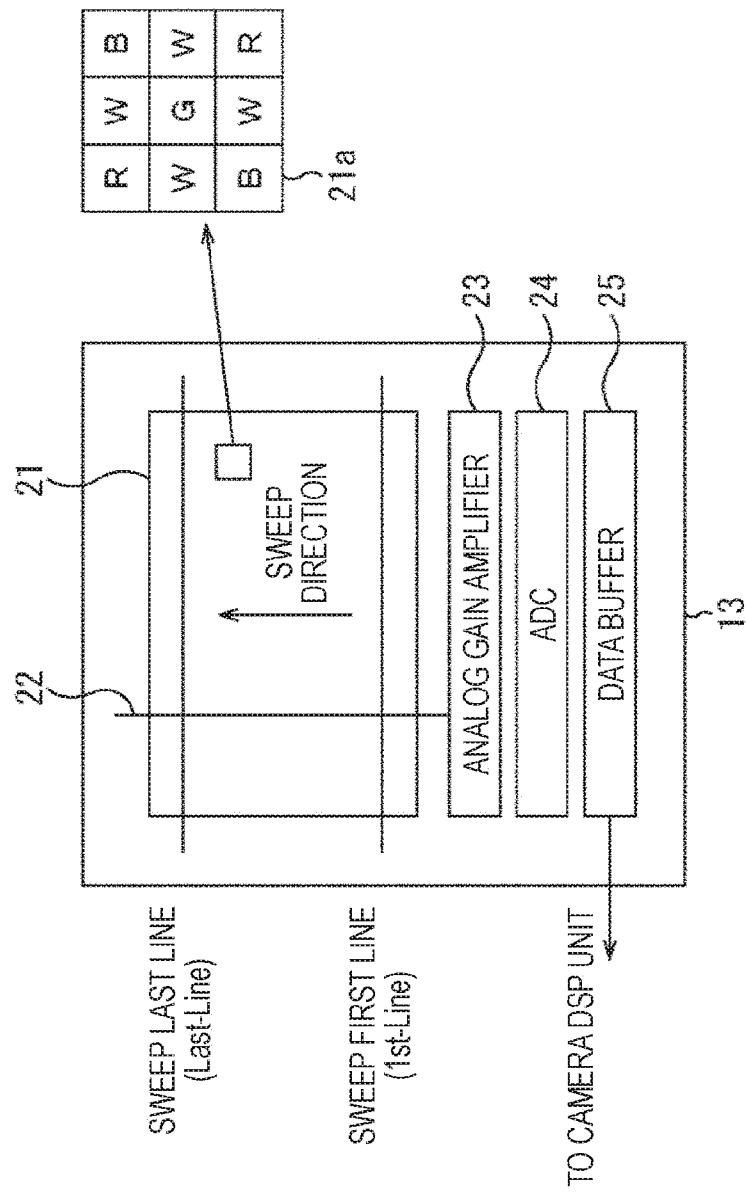
FIG. 3 is a block diagram illustrating an exemplary configuration of a CMOS image sensor.

FIG. 3 illustrates an exemplary configuration of the CMOS image sensor 13. The CMOS image sensor 13 includes a sensor array 21, a signal line 22, an analog gain amplifier 23, an ADC 24, and a data buffer 25. The sensor array 21 includes photoelectric conversion elements for individual pixels arranged vertically and horizontally, and a light receiving surface side of the array is covered with a color filter 21a arranged in a Bayer array, or the like.

Figure 4:
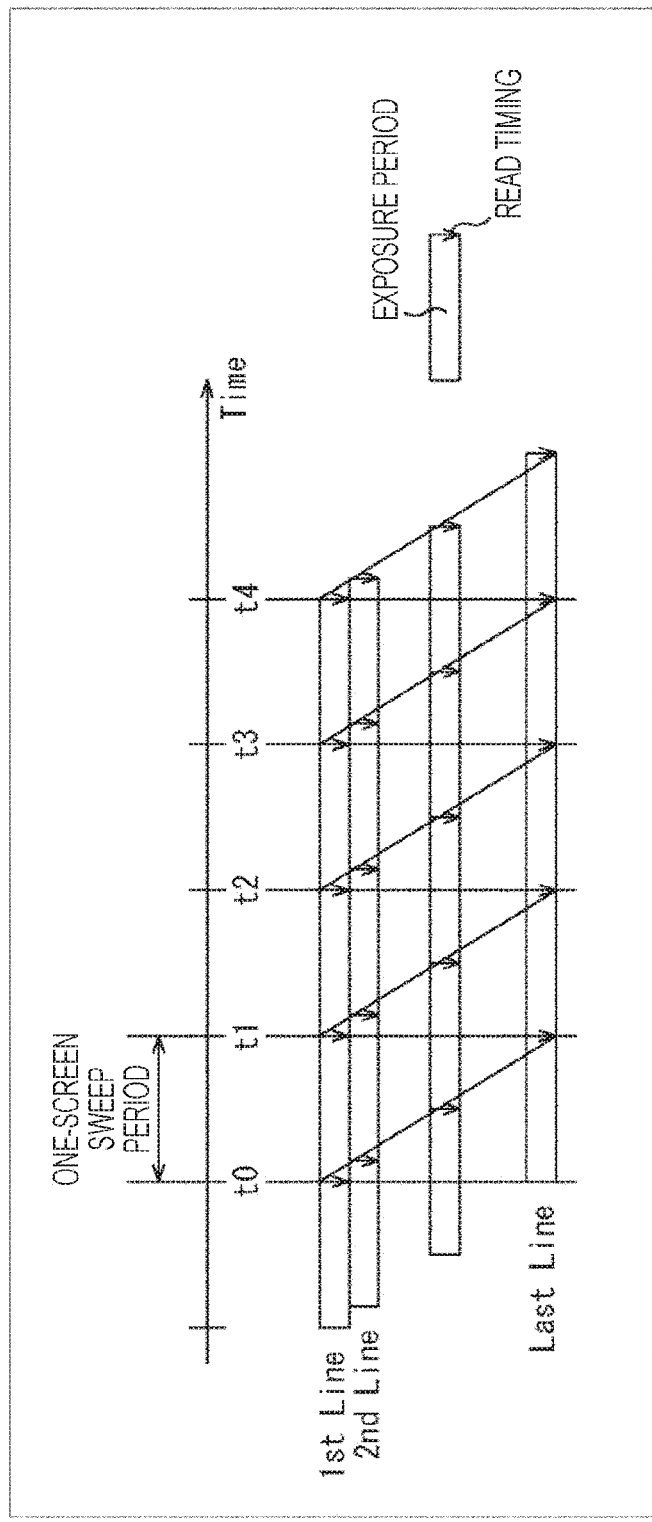
FIG. 4 is a diagram for illustrating a read timing of a charge signal.

FIG. 4 illustrates exposure of each of pixel durations in the sensor array 21 of the CMOS image sensor 13 and a read timing of the charge signal obtained by the exposure. As illustrated in the figure, the CMOS image sensor 13 has a configuration in which the exposure period is shifted line by line in accordance with a sweep direction from a sweep start line (1st-Line) to a last line (Last-Lien), and charge signals obtained during the exposure period are read collectively line by line at a timing of finishing the exposure period.

Note that as will be described below, in the present embodiment, different exposure durations are set for individual colors. For example, exposures are controlled such that red pixels are not exposed and white pixels are exposed during emission of the infrared light.

The read charge signal is output to the analog gain amplifier 23 via the signal line 22 to be amplified and converted into a digital pixel signal by the ADC 24, and stored in the data buffer 25. Note that the gain in the analog gain amplifier 23 can be adaptively set in accordance with illumination. Then, the pixel signals of all the pixels included in the sensor array 21 are output as image signals to the later-stage image processing system. Note that the image signal at this stage is RAW data in which each of pixels has color information of any of R, G and B. Note that RAW data including color information of white (W) can also be used. Hereinafter, an exemplary case of handling RGBW color information will be continuously described.

Returning to FIG. 1. The image processing system of the imaging apparatus 10 includes a camera DSP unit 14 and memories 15 and 16. In the image processing system, the camera DSP unit 14 generates a color image in which each of the pixels has color information of R, G, B, and W on the basis of the image signal from the imaging system. The memories 15 and 16 temporarily hold image signals to be used for noise reduction (NR) processing. In addition, the camera DSP unit 14 generates and outputs a V synchronization signal to control the driving (exposure and reading) of the CMOS image sensor 13 of the imaging system. Furthermore, the camera DSP unit 14 also generates and outputs driver signals (an on/off signal and an intensity adjustment signal) for controlling the irradiation system.

The irradiation system of the imaging apparatus 10 includes an IR drive unit 17 and an IR emission unit 18. The irradiation system has a configuration in which the IR drive unit 17 causes the IR emission unit 18 to emit infrared light under the control of the camera DSP unit 14. The IR emission unit 18 emits infrared light having a peak at a wavelength of 850 nm toward an imaging range. Note that the IR emission unit 18 may be arranged in a housing of the imaging apparatus 10 or may be arranged outside the housing of the imaging apparatus 10.

<Configuration of Camera DSP Unit>

Figure 5:
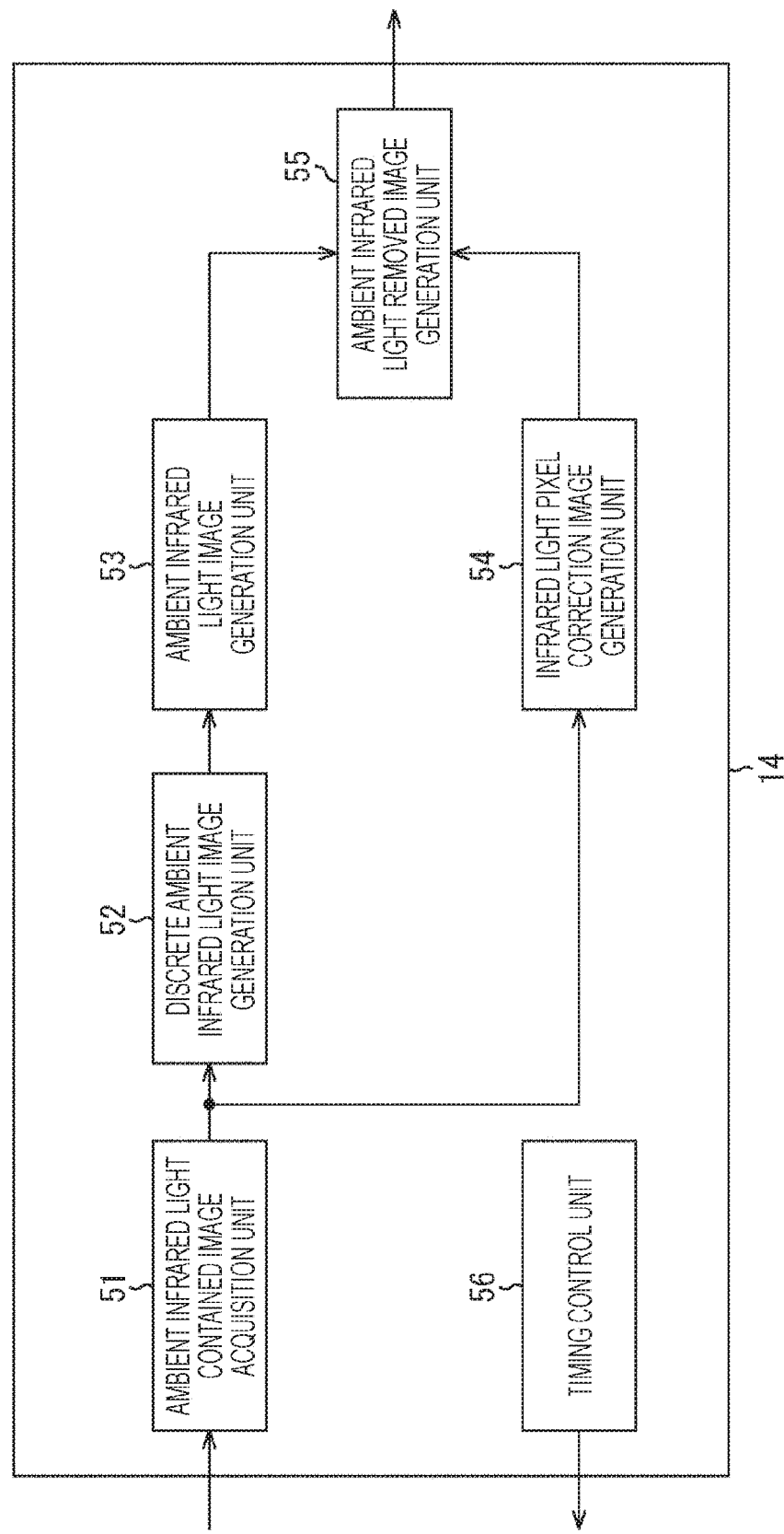
FIG. 5 is a block diagram illustrating an exemplary configuration of a camera DSP unit.

FIG. 5 illustrates an exemplary configuration of the camera DSP unit 14. The camera DSP unit 14 includes an ambient infrared light contained image acquisition unit 51, a discrete ambient infrared light image generation unit 52, an ambient infrared light image generation unit 53, an infrared light pixel correction image generation unit 54, an ambient infrared light removed image generation unit 55, and a timing control unit 56.

The image captured by the CMOS image sensor 13 is processed by the ambient infrared light contained image acquisition unit 51, the discrete ambient infrared light image generation unit 52, the ambient infrared light image generation unit 53, the infrared light pixel correction image generation unit 54, and the ambient infrared light removed image generation unit 55.

The timing control unit 56 generates and outputs a V synchronization signal for controlling the driving (exposure and reading) of the CMOS image sensor 13 of the imaging system, and generates and outputs a driver signal (an on-off signal and an intensity adjustment signal) for controlling a projection optical system.

The ambient infrared light contained image acquisition unit 51 obtains an image signal from the CMOS image sensor 13. Each of the R pixel, the G pixel, the B pixel, and the W pixel receives infrared light together with visible light, and generates a pixel signal containing one color signal from the light. Accordingly, the color signals of these pixels contain a visible light component being a signal photoelectrically converted from the visible light and an infrared light component being a signal photoelectrically converted from the infrared light. That is, the CMOS image sensor 13 captures images including infrared light contained in the environment. Herein, this type of IR contained in the environment is described as ambient infrared light.

The ambient infrared light contained image acquisition unit 51 obtains an image signal of an ambient infrared light contained image containing a visible light component and an ambient infrared light component. The obtained ambient infrared light contained image is supplied to the discrete ambient infrared light image generation unit 52 and the infrared light pixel correction image generation unit 54.

The discrete ambient infrared light image generation unit 52 extracts infrared light pixels from the ambient infrared light contained image. The infrared light pixel is a pixel arranged in the sensor array 21 in a same manner as the R pixel or the like, so as to receive ambient infrared light. The pixels arranged in the sensor array 21 will be additionally described with reference to FIG. 6.

The R pixels, G pixels, B pixels, W pixels, and the infrared light pixels are arranged in the sensor array 21. In FIG. 6, the pixels described as R are the R pixels, the pixels described as G are the G pixels, the pixels described as B are the B pixels, and the pixels described as W are the W pixels. In addition, in FIG. 6, filled squares represent infrared light pixels.

The R pixels, G pixels, B pixels, and W pixels are arranged regularly. Specifically, the pixels in the example illustrated in FIG. 6 are arranged with regularity such that the first line repeats R pixel, W pixel, B pixel, W pixel in this order and the second line repeats W pixel, G pixel, W pixel, and G pixel in this order when viewed in the line direction (horizontal direction).

The W pixel functions as a pixel having panchromatic spectral sensitivity and the R pixel, the G pixel, and the B pixel function as pixels having characteristic spectral sensitivities in individual colors.

While the R pixels, the G pixels, the B pixels, and the W pixels are arranged with regularity, the infrared light pixels are arranged without regularity. In the example illustrated in FIG. 6, the pixel of the row 9-column 7 and the pixel of row 12-column 8 are set as infrared light pixels.

While arranging the infrared light pixels randomly can suppress the occurrence of noise and enhance the image quality, there is a possibility that subsequent signal processing becomes complicated. Infrared light pixels may be arranged regularly as described below. While arranging infrared light pixels regularly can induce the occurrence of noise, subsequent signal processing can be performed relatively easily.

The infrared light pixels are arranged randomly or regularly in the sensor array 21. It is allowable to set whether the infrared light pixels are arranged randomly or regularly depending on desired image quality or signal processing capability. Alternatively, the infrared light pixels may be randomly arranged in a state having a certain degree of regularity. For example, it is allowable to arrange 8×8 pixels as one unit with one infrared light pixel being arranged within the unit, and to arrange the infrared light pixel at a random position within the one unit.

Moreover, the number of infrared light pixels arranged in the sensor array 21 may also be set in accordance with image quality and signal processing capability.

Returning to the description of the configuration of the camera DSP unit 14 illustrated in FIG. 5. The discrete ambient infrared light image generation unit 52 extracts infrared light pixels discretely arranged from the ambient infrared light contained image to generate a discrete ambient infrared light image. Now, processing performed by the camera DSP unit 14 will be additionally described with reference also to FIG. 7.

The CMOS image sensor 13 is exposed to generate an ambient infrared light contained image 101. The ambient infrared light contained image 101 is obtained by the ambient infrared light contained image acquisition unit 51 and supplied to the discrete ambient infrared light image generation unit 52 and the infrared light pixel correction image generation unit 54.

Figure 7:
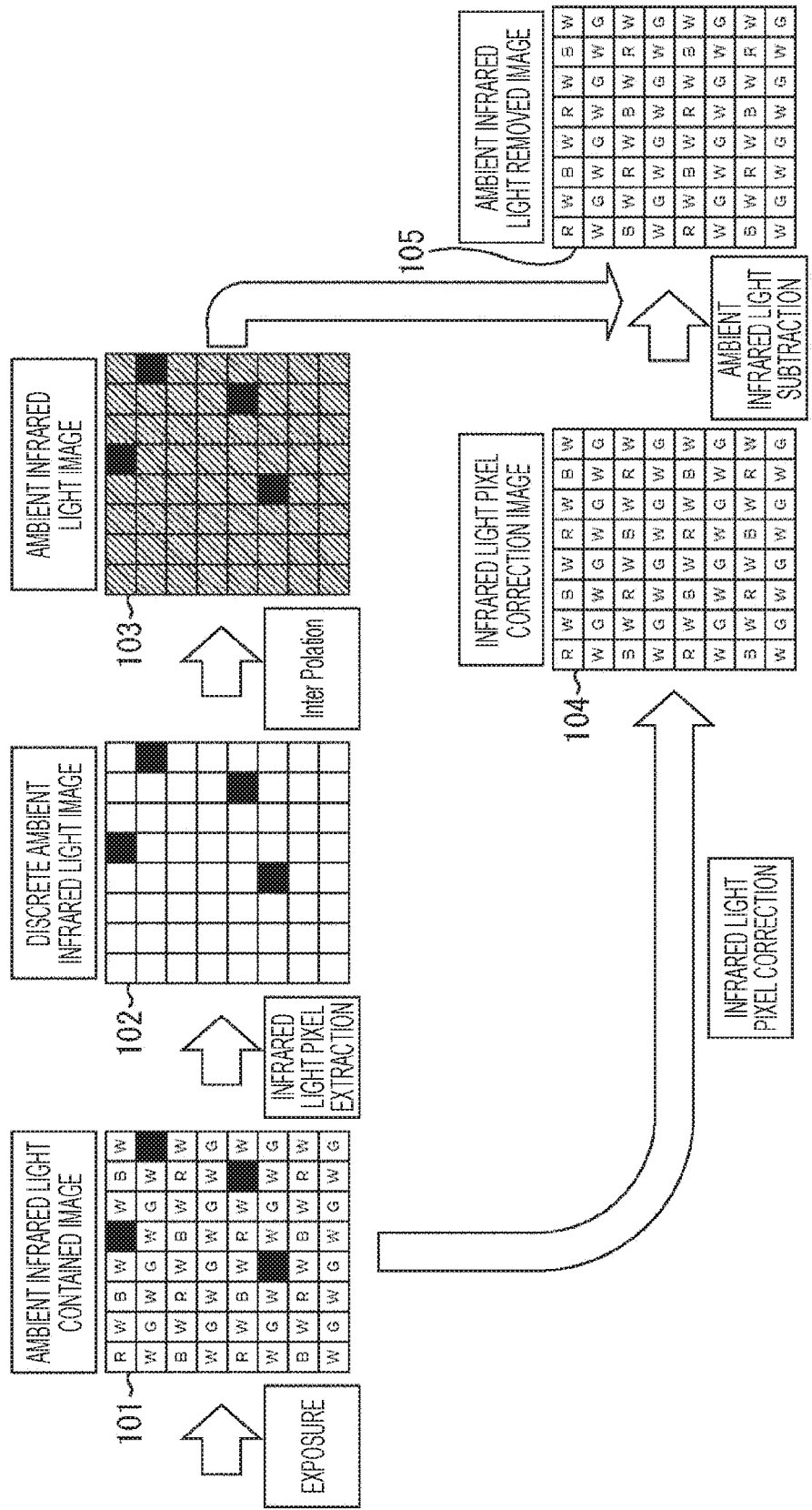
FIG. 7 is a diagram for illustrating an image processed by a camera DSP unit.

The discrete ambient infrared light image generation unit 52 extracts infrared light pixels from the ambient infrared light contained image 101 to generate a discrete ambient infrared light image 102. As illustrated in FIG. 7, the discrete ambient infrared light image 102 is an image having pixel values in selected positions of the infrared light images. The infrared light pixel receives ambient infrared light and outputs a pixel value corresponding to the intensity. The discrete ambient infrared light image 102 is an image having pixel values of discretely arranged infrared light pixels.

The discrete ambient infrared light image 102 generated by the discrete ambient infrared light image generation unit 52 is supplied to the ambient infrared light image generation unit 53 (FIG. 5). The ambient infrared light image generation unit 53 uses the pixel values obtained by the infrared light pixels for the pixels other than the infrared light pixels, that is, the R pixel, the G pixel, the B pixel, and the W pixel, so as to generate pixel values corresponding to the individual pixels. The ambient infrared light image generation unit 53 generates an image (ambient infrared light image 103) obtained in a case where all the pixels in one image are infrared light pixels and supplies the generated image to the ambient infrared light removed image generation unit 55 (FIG. 5).

While such processing is being performed, the infrared light pixel correction image generation unit 54 executes processing of returning the pixel value of the infrared light pixel to the pixel value of the original color pixel. Referring again to FIG. 6. In the pixel arrangement illustrated in FIG. 6, the pixel of the row 9-column 7 and the pixel of row 12-column 8 are set as the infrared light pixels.

According to the regular arrangement of the R pixel, the G pixel, the B pixel, and the W pixel, the pixel of the row 9-column 7 corresponds to the B pixel. That is, the pixel of the row 9-column 7 is originally the B pixel. In such a case, the infrared light pixel correction image generation unit 54 generates a pixel value that could have been obtained in a case where the pixel of the row 9-column 7 was the B pixel and replaces the pixel value of the infrared light pixel of row 9-column 7 with the generated pixel value. The other infrared light pixels are also replaced with the original pixel value that could have been obtained in a case where the pixel was an original color pixel.

The infrared light pixel correction image generation unit 54 generates an infrared light pixel correction image 104 (FIG. 7) containing only pixel values of the R pixel, the G pixel, the B pixel, and the W pixel (that is, not including the pixel values of the infrared light pixels) and supplies the generated image to the ambient infrared light removed image generation unit 55.

The ambient infrared light image 103 and the infrared light pixel correction image 104 are supplied respectively from the ambient infrared light image generation unit 53 and the infrared light pixel correction image generation unit 54 to the ambient infrared light removed image generation unit 55. The ambient infrared light image 103 is an image containing the ambient infrared light component. The infrared light pixel compensation image 104 is an image containing the visible light component and the ambient infrared light component.

The ambient infrared light removed image generation unit 55 subtracts the ambient infrared light image 103 containing the ambient infrared light component from the infrared light pixel compensation image 104 containing the visible light component and the ambient infrared light component, so as to generate an ambient infrared light removed image 105 (FIG. 7) containing the visible light component from which the ambient infrared light component has been removed.

In this manner, the camera DSP unit 14 executes processing for generating an image from which the ambient infrared light has been removed.

Note that the processing of the camera DSP unit 14 may include noise reduction processing. For example, the ambient infrared light contained image acquisition unit 51 may perform processing of reducing noise (noise reduction) on the ambient infrared light contained image 101 when the unit obtains the ambient infrared light contained image 101, and the processed ambient infrared light contained image 101 may be supplied to the discrete ambient infrared light image generation unit 52 and the infrared light pixel correction image generation unit 54.

Moreover, demosaicing processing may be executed. For example, the pixel obtained from the imaging element covered with a red (R) filter has no information of the G pixel, the B pixel, or the W pixel in processing of obtaining the information of the G pixel, the B pixel, and the W pixel for the R pixel. Accordingly, calculation is performed using pixel information of the G pixel, the B pixel, and the W pixel in the neighborhood of the R pixel, so as to perform complementary processing. This processing is referred to as demosaic processing.

The demosaic processing toward the infrared light pixel is executed by the discrete ambient infrared light image generation unit 52 and the ambient infrared light image generation unit 53 (FIG. 5). In this case, pixel values at positions of the pixels other than the infrared light pixels are calculated from the pixel values of infrared light pixels, and interpolation processing is performed, leading to generation of the ambient infrared light image 103 in which a pixel value indicating the intensity of the ambient infrared light is interpolated to each of all the pixels within one image.

It is also allowable to have a configuration in which the demosaic processing is performed also for each of the pixels of R, G, B, and W pixels, for example, as processing before or after the infrared light pixel correction image 104 is generated by the infrared light pixel correction image generation unit 54, and the infrared light pixel correction image generation unit 54 generates an R image including the pixel value of the R pixel alone, a G image including the pixel value of the G pixel alone, a B image including the pixel value of the B pixel alone, and a W image including the pixel value of the W pixel alone and supplied to the ambient infrared light removed image generation unit 55.

In addition, it is allowable to have a configuration of the ambient infrared light removed image generation unit 55, in which the ambient infrared light is subtracted from each of the R image, the G image, the B image, and the W image, so as to generate the R image, the G image, the B image, and the W image, from which the ambient infrared light has been removed.

Alternatively, it is allowable to have a configuration in which the ambient infrared light image 103 is subtracted from the infrared light pixel correction image 104 by the ambient infrared light removed image generation unit 55 to generate the ambient infrared light removed image 105 and thereafter the demosaic processing is executed so as to generate the R image, the G image, the B image, and the W image.

<Emission of Infrared Light>

Meanwhile for example, a camera such as a surveillance camera operating day and night has a configuration in which an imaging element such as the CMOS image sensor 13 has sensitivity to a wavelength region of about 400 nm to 1000 nm, and when the direct light from the subject is incident, a reddish image is produced due to the sensitivity to the wavelength component (about 700 nm to 1000 nm) of the infrared region.

The imaging apparatus 10 according to the present embodiment uses the camera DSP unit 14 to remove the ambient infrared light as described above, leading to achievement of color reproducibility similar to the case of human eyes.

However, while it is possible to obtain a color image with satisfactory color reproduction in a bright situation such as daytime when the light of the wavelength component in the infrared region has been removed as described above, it is difficult to obtain a satisfactory image when it is dark with the small amount of visible light such as in the nighttime, compared with the case of the daytime.

To cope with this dark situation such as nighttime with small amount of visible light, the imaging apparatus 10 includes the IR emission unit 18 and emits infrared light and also uses reflected light of the emitted infrared light for imaging so as to enhance the sensitivity. On the other hand, simply emitting the infrared light would receive reflected light of the emitted infrared light reflected by the subject, that is, receive simply the light reception intensity of the reflected light (infrared light), making it difficult to obtain color information such as R, G, and B. With this configuration, the obtained image would be a monochrome image such as gray or green.

Fortunately, however, in order to achieve acquisition of a color image even by the infrared light in a dark situation with the small amount of visible light as in the nighttime, the imaging apparatus 10 according to the present technology controls the emission of the infrared light and exposure as described with reference to FIG. 8.

Figure 8:
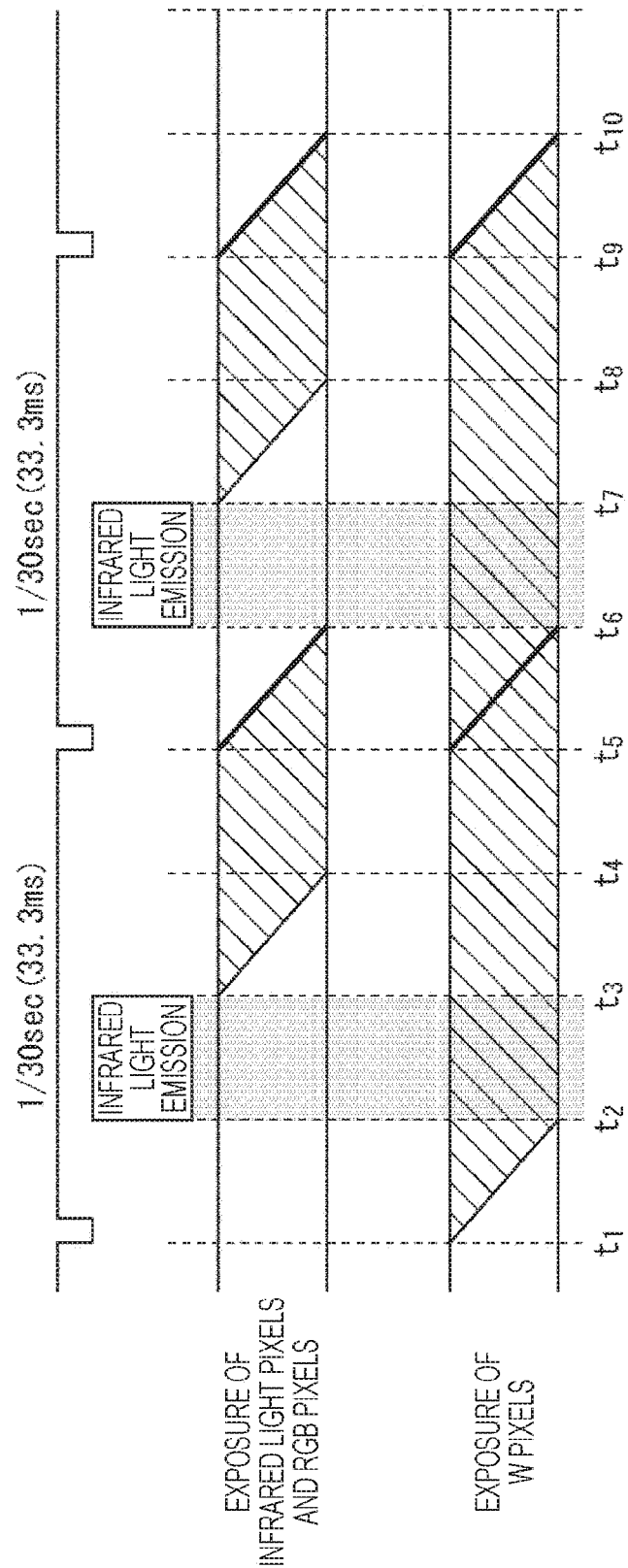
FIG. 8 is a diagram for illustrating exposure.

In FIG. 8, the upper zone illustrates exposure of the infrared light pixel, the R pixel, the G pixel, and the B pixel, while the lower zone illustrates exposure of the W pixel.

At time t1, exposure of the W pixel of the first line is started. At time t2, at time t2, the exposure of the W pixel of the last line is started. In addition, together with this, emission of infrared light is started by the IR emission unit 18. In this manner, emission of infrared light is started by the IR emission unit 18 after all lines of the W pixel have been exposed.

At time t3, the emission of the infrared light by the IR emission unit 18 is stopped. Together with this, exposure of the infrared light pixels, R pixels, G pixels, and B pixels, of the first line, is started at time t3. Moreover, exposure of the infrared light pixels, R pixels, G pixels, and B pixels, of the last line, is started at time t4.

Subsequently, exposure of the infrared light pixels, R pixels, G pixels, B pixels, and W pixels, of the first line, is finished at time t5. In addition, exposure of the infrared light pixels, R pixels, G pixels, B pixels, and W pixels, of the last line, is finished at time t6.

Among the duration from time t1 to time t6, the infrared light is emitted for a selected duration from time t2 to time t3, and is not emitted for other durations. The W pixel is maintained in a state of being exposed for the duration from time t1 to time t6. Among the duration from time t1 to time t6, the infrared light pixel, the R pixel, the G pixel, and the B pixel are maintained in the state of being exposed from time t3 to time t5.

Emission of infrared light and exposure of each of the pixels are controlled in this manner. That is, emission of the infrared light is performed for a limited duration in which the W pixel is being exposed, and is not performed during exposure of the infrared light pixel, the R pixel, the G pixel, and the B pixel. With this configuration, the W pixel receives reflected light of emitted infrared light, making it possible to perform imaging with sufficient luminance.

In contrast, imaging on the infrared light pixels is performed at a time when infrared light is not emitted, making it possible to perform imaging targeted at the infrared light in the environment without being influenced by emission of infrared light. Imaging on the R pixel, G pixel and B pixel is performed at a time when infrared light is not emitted, making it possible to perform imaging of the subject without being influenced by emission of infrared light.

A color image can be generated from images captured by the R pixel, the G pixel, and the B pixel. Even when the image is captured in a dark situation with a small amount of visible light such as in the nighttime, it is possible to ensure the reproducibility of luminance by the image captured by the W pixel. Therefore, by using the image captured by the W pixel, it is possible to correct the luminance of the color image generated from the image captured by each of the R pixel, the G pixel, and the B pixel.

In addition, ambient infrared light can be removed using an image captured with infrared light pixels, making it possible to prevent production of a reddish image and obtain an image with enhanced image quality.

As described above, according to the present technology, color information and low-frequency components of the luminance information are generated from pixels (such as R pixels) not receiving the emitted infrared light, while high-frequency components of the luminance information can be generated from the pixels receiving the emitted infrared light (W pixels).

In this manner, even in a dark situation with a small amount of visible light is small such as nighttime, it is possible to capture a color image. Furthermore, it is possible to make the color image with good image quality.

Note that the infrared light may be emitted exclusively in a dark situation with the small amount of visible light such as nighttime as described above, or may be emitted also in brightness such as daytime. Still, since sufficient luminance information can be obtained without emitting infrared light in brightness such as daytime, and therefore, controlling so as to emit infrared light exclusively in a dark situation with the small amount of visible light such as nighttime as described above enables reduction of power consumption.

It is also allowable to apply uniform exposure duration to each of the pixels (R pixel, G pixel, B pixel, and W pixel) when no infrared light is emitted. Alternatively, the exposure duration of the R pixel, the G pixel, and the B pixel may be set to be longer than the exposure duration of the W pixel in consideration of the sensitivity difference.

<Processing of Camera DSP Unit>

Figure 9:
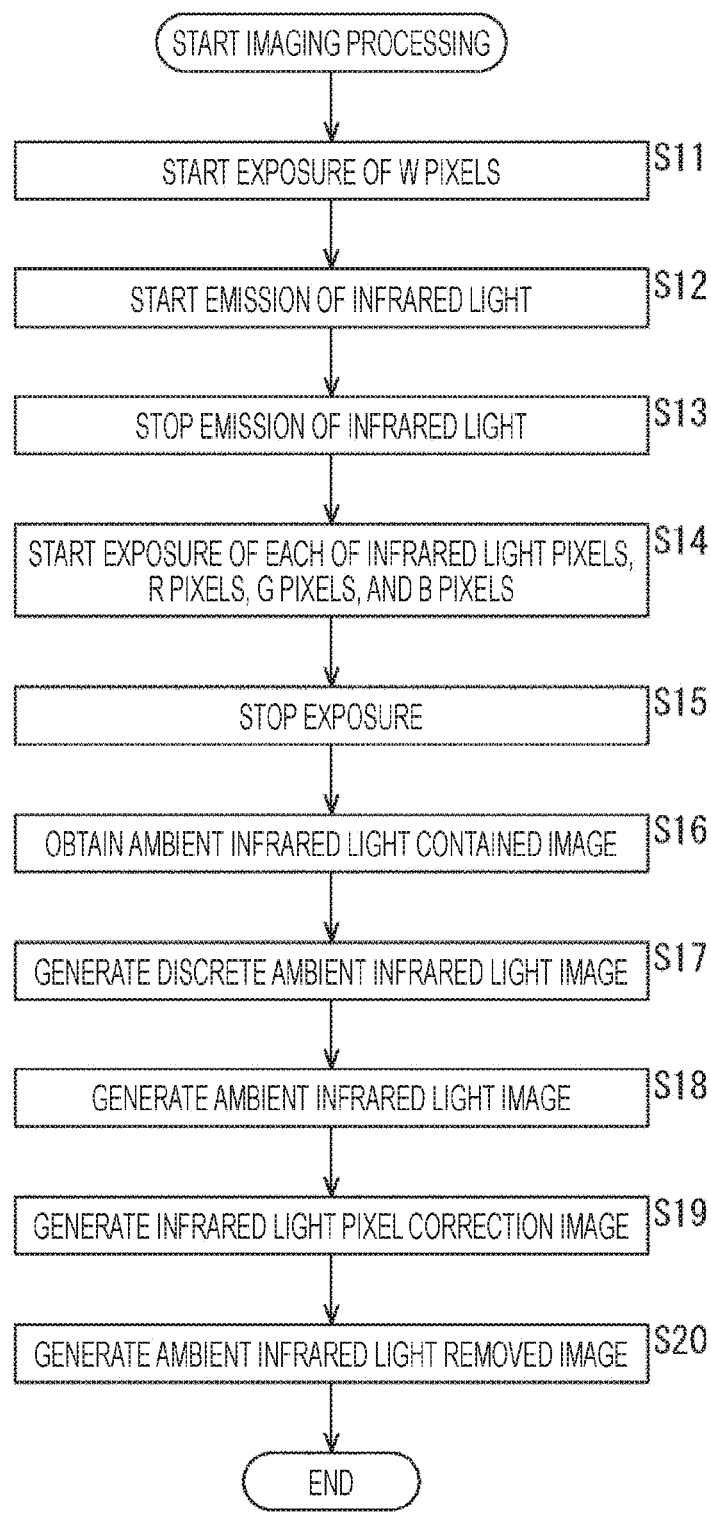
FIG. 9 is a flowchart for illustrating processing of the camera DSP unit.

Processing of the camera DSP unit 14 illustrated in FIG. 5 will be described with reference to the flowchart illustrated in FIG. 9.

In step S11, the timing control unit 56 generates a signal for starting the exposure of the W pixel and supplies the signal to the CMOS image sensor 13. In step S12, the timing control unit 56 instructs the IR drive unit 17 (FIG. 1) to start emission of infrared light (outputs an on signal) in order to start emission of infrared light.

In step S13, the timing control unit 56 instructs the IR drive unit 17 (FIG. 1) to stop emission of infrared light (outputs an off signal) in order to stop emission of the infrared light. In step S14, the timing control unit 56 generates a signal for starting exposure of the infrared light pixels, the R pixels, the G pixels, and the B pixels (other than the W pixels), and supplies the signal to the CMOS image sensor 13.

In step S15, the timing control unit 56 generates a signal for stopping the exposure of the infrared light pixel, the R pixel, the G pixel, the B pixel, and the W pixel (all the pixels), and supplies the signal to the CMOS image sensor 13.

For example, processing in step S11 is executed at time t1 (FIG. 8), processing in step S12 is executed at time t2 (FIG. 8), and processing in step S13 is executed in time t3 (FIG. 8). Moreover, processing in step S14 is executed at time t3 (FIG. 8), and processing in step S15 is executed at time t5 (FIG. 8).

In step S16, the ambient infrared light contained image acquisition unit 51 obtains the ambient infrared light contained image 101 from the CMOS image sensor 13. The obtained ambient infrared light contained image 101 is supplied to the discrete ambient infrared light image generation unit 52 and the infrared light pixel correction image generation unit 54.

In step S17, the discrete ambient infrared light image generation unit 52 extracts infrared light pixels from the supplied ambient infrared light contained image 101, and generates the discrete ambient infrared light image 102. The generated discrete ambient infrared light image 102 is supplied to the ambient infrared light image generation unit 53.

In step S18, the ambient infrared light image generation unit 53 calculates pixel values at pixel positions other than infrared light pixels using the supplied discrete ambient infrared light image 102, and performs interpolation processing to generate the ambient infrared light image 103 in which pixel values indicating the intensity of the ambient infrared light are interpolated in all the pixels within the one image. The generated ambient infrared light image 103 is supplied to the ambient infrared light removed image generation unit 55.

In step S19, the infrared light pixel correction image generation unit 54 interpolates the pixel value of the pixel corresponding to the infrared pixel among the supplied ambient infrared light contained image 101 using the pixel value of the pixel in proximity, to be corrected to a pixel value corresponding to the R pixel, the G pixel, the B pixel, or the W pixel. The infrared light pixel correction image 104 in which the pixel value of the infrared pixel has been corrected is supplied to the ambient infrared light removed image generation unit 55.

In step S20, the ambient infrared light removed image generation unit 55 subtracts the ambient infrared light image 103 from the supplied infrared light pixel correction image 104 to generate the ambient infrared light removed image 105 from which the ambient infrared light has been removed and outputs the image to a later-stage processing unit (not illustrated).

Such processing is performed in the camera DSP unit 14. Note that noise reduction processing and demosaic processing may be included between these procedures of processing.

<Another Arrangement of Infrared Light Pixels>

FIG. 10 illustrates another arrangement example of infrared light pixels. While the arrangement of the infrared light pixels described with reference to FIG. 6 is an irregular arrangement, the arrangement of the infrared light pixels illustrated in FIG. 10 is an example of regular arrangement.

The infrared light pixels illustrated in FIG. 10 are arranged in even rows and even columns. For example, infrared light pixels are arranged at column 2, column 6, column 10, and column 14 in row 2. For example, infrared light pixels are arranged at column 4, column 8, column 12, and column 16 in row 4.

The infrared light pixels illustrated in FIG. 10 are arranged at positions where the G pixels are to be arranged. More G pixels are arranged than R pixels and B pixels. Some of the G pixels arranged in larger numbers may be set as infrared light pixels.

In this manner, infrared light pixels may be regularly arranged in the sensor array 21 (FIG. 3). By arranging the infrared light pixels regularly in this manner, it is possible to reduce signal processing such as interpolation processing of pixel values when the ambient infrared light image generation unit 53 generates the ambient infrared light image 103 as compared with the case where infrared light pixels are randomly arranged.

FIG. 11 is a diagram illustrating still another arrangement example of infrared light pixels. In FIG. 11, hatched pixels correspond to infrared light pixels. In comparison of the pixel arrangement illustrated in FIG. 10 with the pixel arrangement illustrated in FIG. 11, some of the pixels arranged as W pixels in the pixel arrangement illustrated in FIG. 10 are arranged as infrared light pixels in the pixel arrangement illustrated in FIG. 11. In the arrangement example illustrated in FIG. 11, the infrared light pixels are regularly arranged like the arrangement example illustrated in FIG. 10.

The arrangement example of the infrared light pixels illustrated in FIG. 11 is an example in which pixels corresponding to half of the pixels defined as W pixels in the RGBW pixel array are set as infrared light pixels. In the pixel arrangement illustrated in FIG. 11, two types of W pixels are arranged, specifically, one is a W pixel that receives emitted infrared light, and the other is a W pixel that does not receive emitted infrared light. Among them, the W pixel that does not receive the emitted infrared light functions as an infrared light pixel that receives the ambient infrared light.

The exposure of the W pixel that does not receive the emitted infrared light and that functions as the infrared light pixel is controlled in the same manner as the exposure of the infrared light pixel illustrated in FIG. 8. That is, exposure toward the W pixel (infrared light pixel) that does not receive the emitted infrared light is started from time t3 at which emission of infrared light is stopped.

It is allowable to arrange the infrared light pixels regularly on the sensor array 21 (FIG. 3) in this manner. In addition, a portion of the W pixels arranged in the sensor array 21 may be arranged as the pixels that do not receive the emitted infrared light and may function as infrared light pixels.

In addition, as illustrated in FIG. 11, a portion of the W pixels may be set as infrared light pixels, and the infrared light pixels may be randomly arranged. While the W pixels are originally arranged regularly, the pixels set as infrared light pixels among the W pixels need not be arranged regularly.

In this case, by managing an address of each of the pixels set as the infrared light pixels and performing control such that the pixel corresponding to the managed address is not to be exposed when the infrared light is emitted, it is possible to perform processing similarly to the case described above.

Moreover, in the case of managing the address of the infrared light pixel, for example, it is also allowable to change the number of pixels to be set as the infrared light pixel in accordance with the ambient photographing brightness. For example, when photographing is performed in a bright environment, the image quality is strongly influenced by the ambient infrared light, and thus, it is allowable to increase the pixels to function as infrared light pixels. In contrast, when photographing is performed in a dark environment, the image quality is not so much influenced by the ambient infrared light, and thus, it is allowable to reduce the number of pixels to function as infrared light pixels while relatively increasing the number of W pixels so as to achieve imaging with higher S/N ratio.

Moreover, pixels to be set as infrared light pixels may be changed appropriately. It is allowable to determine which pixel in the sensor array 21 is to be set as the infrared light pixel in accordance with the imaging environment or the like and to control such that the determined pixels would not to be exposed while the infrared light is emitted.

In addition, in a case where the infrared light pixel is managed by an address, the address may be stored in a static defective pixel correction circuit to allow processing such as correction to be performed. Since the static defective pixel correction circuit is often provided in the imaging apparatus, such a static defective pixel correction circuit can be used to suppress enlargement of circuit scale or complication of processing even in the case where infrared light pixels are provided.

Note that managing infrared light pixels by addresses is applicable to all the embodiments described above. Even in the case where infrared light pixels are discretely arranged as illustrated in FIG. 6, for example, it is possible to manage the positions of the infrared light images discretely arranged by the addresses to perform control of exposure or the like.

The present technology can be applied to enable generating high image quality color images regardless of the infrared light component contained in ambient light.

<Exemplary Application of Imaging Apparatus>

Figure 12:
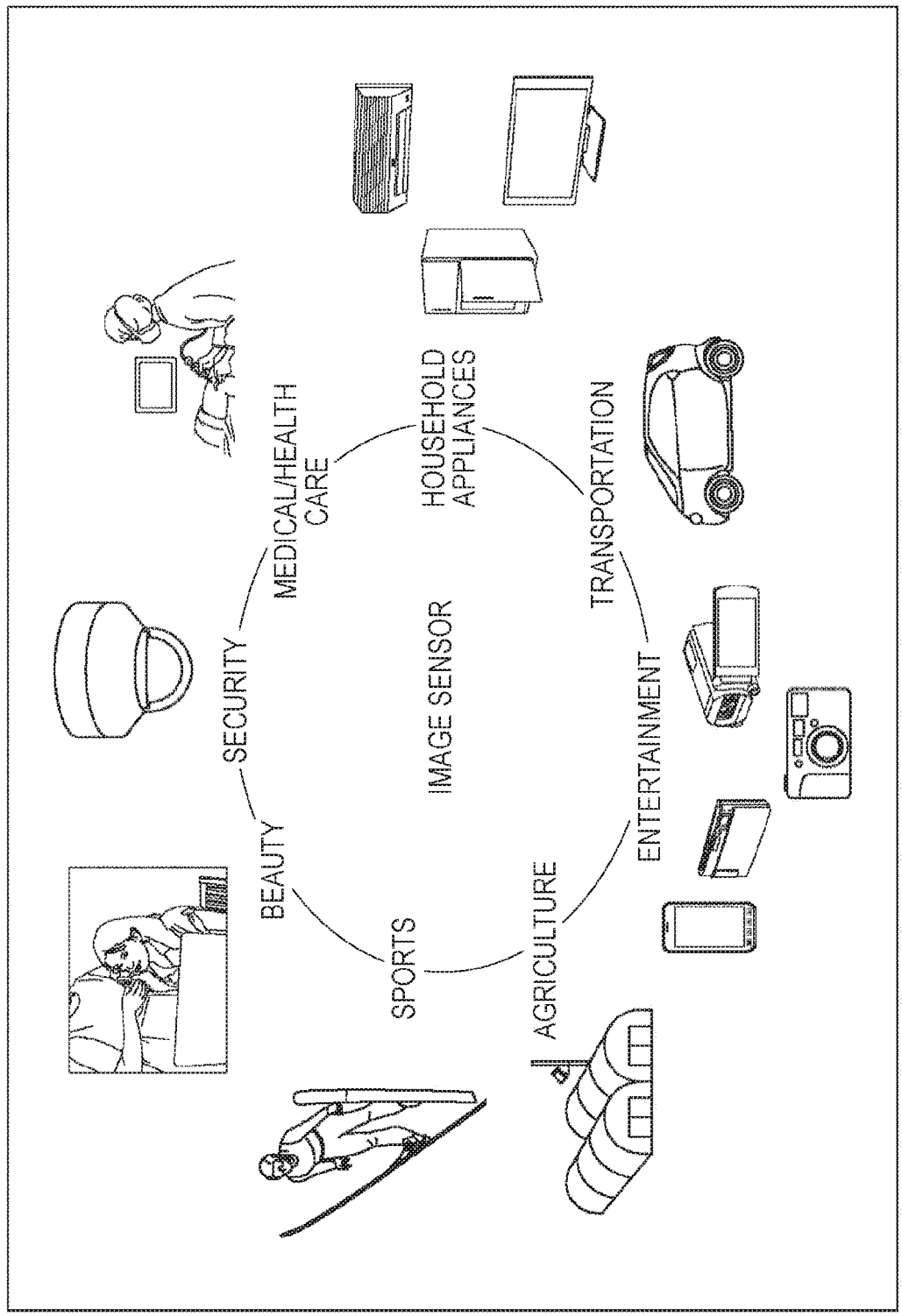
FIG. 12 is a view for illustrating an exemplary application of the imaging apparatus.

FIG. 12 is a diagram illustrating exemplary application of the above-described imaging apparatus.

The imaging apparatus is applicable to various situations in which sensing is performed for light including visible light, infrared light, ultraviolet light, X-ray, and the like. Examples of such situations are described as follows.

A device for capturing an image for entertainment, such as a digital camera and a mobile phone with a camera function.

A device for transportation, such as an on-vehicle sensor that images a front, back, surroundings, interior, or the like, of a vehicle in order to, for example, ensure safe driving including automatic stop and the like, and to recognize driver's conditions, a surveillance camera to monitor driving vehicles and roads, and a range-finding sensor to perform measurement of a distance between vehicles, or the like.

A device for household appliances including a TV, a refrigerator, an air conditioner, and the like to photograph user's gesture and perform operation of the apparatus according to the gesture.

A device for medical and health care fields, such as an endoscope, and a device for angiography using reception of infrared light.

A device for security, such as a surveillance camera for crime prevention, and a camera for personal authentication.

A device for beauty, such as a skin measuring instrument to photograph the skin, and a microscope to photograph the scalp.

A device for sports, such as an action camera and a wearable camera for sports applications and the like.

A device for agriculture, such as a camera to monitor conditions of fields and crops.

<Recording Medium>

A series of processing described above can be executed in hardware or with software. In a case where the series of processing is executed with software, a program included in the software is installed in a computer. Herein, the computer includes a computer incorporated in a dedicated hardware, and for example, a general-purpose personal computer on which various types of functions can be executed by installing various programs.

Figure 13:
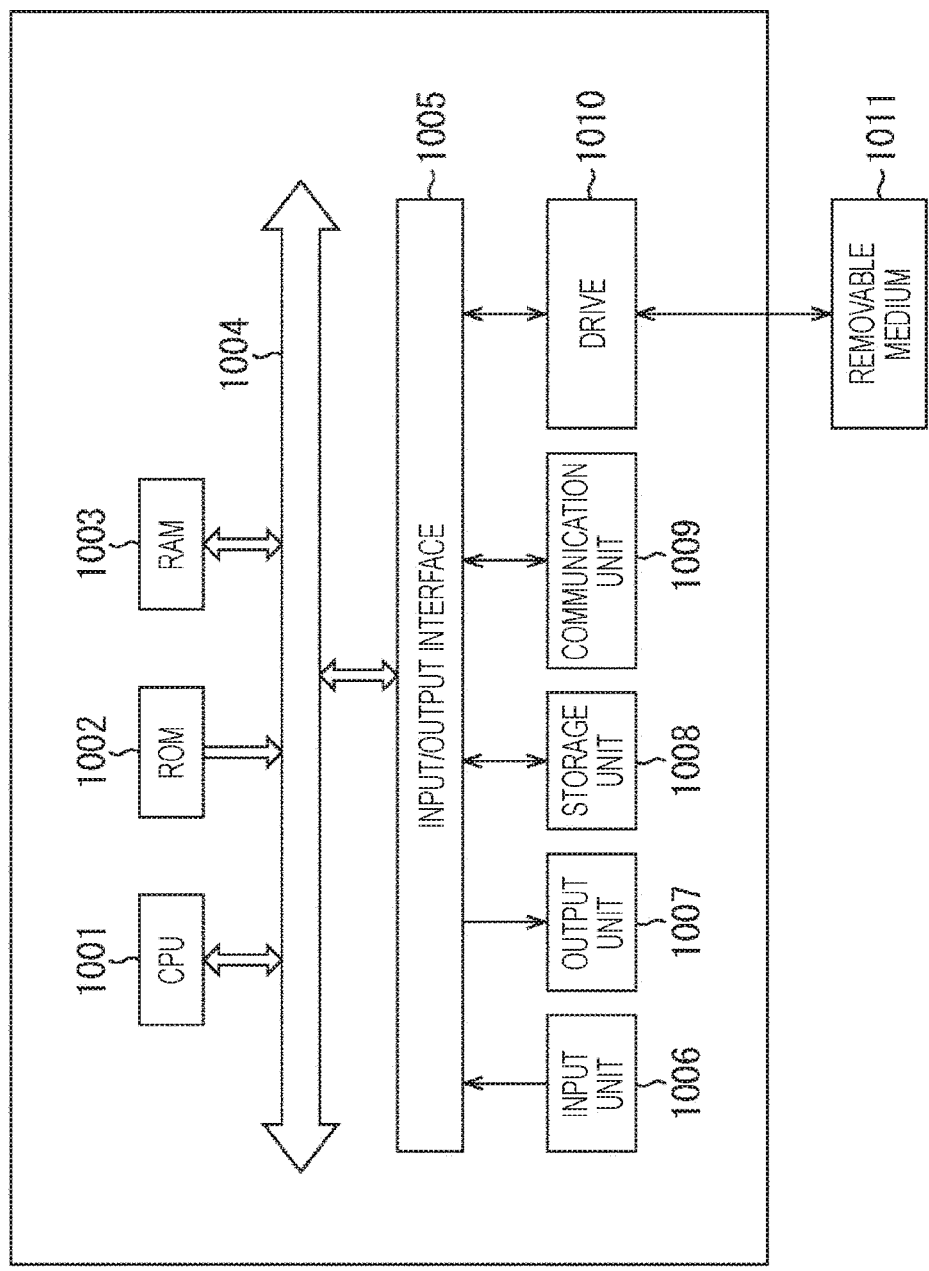
FIG. 13 is a diagram for illustrating a recording medium.

FIG. 13 is a block diagram illustrating an exemplary configuration of hardware of a computer in which the series of processing described above is executed by a program. In a computer, a central processing unit (CPU) 1001, a read only memory (ROM) 1002, a random access memory (RAM) 1003 are interconnected with each other via a bus 1004. The bus 1004 is further connected with an input/output interface 1005. The input/output interface 1005 is connected with an input unit 1006, an output unit 1007, a storage unit 1008, a communication unit 1009, and a drive 1010.

The input unit 1006 includes a key board, a mouse, a microphone, and the like. The output unit 1007 includes a display, a speaker, and the like. The storage unit 1008 includes a hard disk, a non-volatile memory, and the like. The communication unit 1009 includes a network interface and the like. The drive 1010 drives a removable medium 1011 including, for example, a magnetic disk, an optical disk, a magneto-optical disk, or a semiconductor memory.

On the computer configured as above, the series of above-described processing is executed by operation such that the CPU 1001 loads, for example, a program stored in the storage unit 1008 onto the RAM 1003 via the input/output interface 1005 and the bus 1004 and executes the program.

The program executed by the computer (CPU 1001) can be stored, for example, in the removable medium 1011 as a package medium or the like and be provided. Alternatively, the program can be provided via a wired or wireless transmission medium including a local area network, the Internet, and digital satellite broadcasting.

On the computer, the program can be installed in the storage unit 1008 via the input/output interface 1005, by attaching the removable medium 1011 to the drive 1010. In addition, the program can be received at the communication unit 1009 via a wired or wireless transmission medium and be installed in the storage unit 1008. Alternatively, the program can be installed in the ROM 1002 or the storage unit 1008 beforehand.

Note that the program executed by the computer may be a program processed in a time series in an order described in the present description, or can be a program processed in required timing such as being called.

Moreover, in the present specification, a system represents an entire apparatus including a plurality of apparatuses.

Note that effects described herein are provided for purposes of exemplary illustration and are not intended to be limiting. Still other effects may also be contemplated.

Note that embodiments of the present technology are not limited to the above-described embodiments but can be modified in a variety of ways within a scope of the present technology.

Note that the present technology may also be configured as follows.

(1)
An imaging apparatus including:
an infrared light emission unit that emits infrared light;
a sensor array in which a plurality of pixels is arranged, the plurality of pixels including a first pixel that includes a period during which the infrared light is emitted by the infrared light emission unit as an exposure duration, a second pixel that does not include a period during which the infrared light is emitted as the exposure duration, and an infrared light pixel that receives infrared light contained in ambient light;
an acquisition unit that obtains an infrared light image captured by the first pixel, a visible image captured by the second pixel, and an ambient infrared light image captured by the infrared light pixel; and
an image generation unit that generates an image as a result of removing the infrared light contained in the ambient light from the infrared light image and the visible image using the ambient infrared light image.

(2)
The imaging apparatus according to (1),
in which the first pixel is a pixel having panchromatic spectral sensitivity and the second pixel is a pixel having spectral sensitivity characteristic in a predetermined color.

(3)
The imaging apparatus according to (1) or (2),
in which exposure control of the infrared light pixel is the same as exposure control of the second pixel.

(4)
The imaging apparatus according to any of (1) to (3),
in which the infrared light pixels are discretely arranged within the sensor array.

(5)
The imaging apparatus according to any of (1) to (3),
in which the infrared light pixels are regularly arranged within the sensor array.

(6)
The imaging apparatus according to any of (1) to (5),
in which a portion of the first pixel is the infrared light pixel.

(7)
The imaging apparatus according to any of (1) to (6), in which a position of the infrared light pixel is managed by an address.

(8)
The imaging apparatus according to any of (1) to (7),
in which correction of the infrared light pixel to a pixel value of a case where the infrared light pixel is one of the first pixel value and the second pixel is performed, and the ambient infrared light image is subtracted from the corrected infrared light image and the visible image so as to generate an image from which infrared light contained in the ambient light has been removed.

(9)
The imaging apparatus according to (8),
in which the address of the infrared light pixel is stored in a static defective pixel correction circuit and the correction is performed by the static defective pixel correction circuit.

(10)
An imaging method including:
emitting infrared light;
from a sensor array in which a plurality of pixels is arranged, the plurality of pixels including a first pixel that includes a period during which the infrared light is emitted as an exposure duration, a second pixel that does not include a period during which the infrared light is emitted as the exposure duration, and an infrared light pixel that receives infrared light contained in ambient light, obtaining an infrared light image captured by the first pixel, a visible image captured by the second pixel, and an ambient infrared light image captured by the infrared light pixel; and
generating an image as a result of removing the infrared light contained in the ambient light from the infrared light image and the visible image using the ambient infrared light image.

(11)
A program for causing a computer to execute processing including steps of:
emitting infrared light;
from a sensor array in which a plurality of pixels is arranged, the plurality of pixels including a first pixel that includes a period during which the infrared light is emitted as an exposure duration, a second pixel that does not include a period during which the infrared light is emitted as the exposure duration, and an infrared light pixel that receives infrared light contained in ambient light, obtaining an infrared light image captured by the first pixel, a visible image captured by the second pixel, and an ambient infrared light image captured by the infrared light pixel; and generating an image as a result of removing the infrared light contained in the ambient light from the infrared light image and the visible image using the ambient infrared light image.

REFERENCE SIGNS LIST

10 Imaging apparatus
14 Camera DSP unit
18 IR emission unit
21a Color filter
51 Ambient infrared light contained image acquisition unit
52 Discrete ambient infrared light image generation unit
53 Ambient infrared light image generation unit
54 Infrared light pixel correction image generation unit
55 Ambient infrared light removed image generation unit
56 Timing control unit

The invention claimed is:

1. An imaging apparatus, comprising:
an infrared light emission unit configured to emit a first infrared light;
a sensor array comprising a plurality of pixels, wherein the plurality of pixels comprises:
a first pixel;
a second pixel different from the first pixel; and
an infrared light pixel configured to receive a second infrared light contained in ambient light, wherein
a first exposure duration of the first pixel is a period during which the first infrared light is emitted by the infrared light emission unit,
a second exposure duration of the second pixel is a period during which emission of the first infrared light is stopped, and the second exposure duration is longer than the first exposure duration; and circuitry configured to:
obtain an infrared light image captured by the first pixel, a visible image captured by the second pixel, and an ambient infrared light image captured by the infrared light pixel;
remove the first infrared light from the infrared light image and the visible image based on the ambient infrared light image; and
generate a final image based on the removal of the first infrared light.

2. The imaging apparatus according to claim 1, wherein the first pixel has a panchromatic spectral sensitivity and the second pixel has a spectral sensitivity characteristic in a determined color.

3. The imaging apparatus according to claim 1, wherein exposure control of the infrared light pixel is same as exposure control of the second pixel.

4. The imaging apparatus according to claim 1, wherein the infrared light pixel is discretely arranged within the sensor array.

5. The imaging apparatus according to claim 1, wherein the infrared light pixel is regularly arranged within the sensor array.

6. The imaging apparatus according to claim 1, wherein a portion of the first pixel is the infrared light pixel.

7. The imaging apparatus according to claim 1, wherein a position of the infrared light pixel is managed based on an address.

8. The imaging apparatus according to claim 1, wherein the circuitry is further configured to:
correct a first pixel value of the infrared light pixel to a second pixel value of a case where the infrared light pixel is one of the first pixel or the second pixel;
generate a corrected infrared light image based on the correction; and
generate the final image based on subtraction of the ambient infrared light image from the corrected infrared light image and the visible image,
wherein the infrared light contained in the ambient light is removed in the final image.

9. The imaging apparatus according to claim 8, wherein an address of the infrared light pixel is stored in a static defective pixel correction circuit, and
the static defective pixel correction circuit is configured to correct the first pixel value of the infrared light pixel.

10. An imaging method, comprising:
in an imaging apparatus:
emitting a first infrared light, wherein
the imaging apparatus comprises a sensor array comprising a plurality of pixels,
the plurality of pixels comprises:
a first pixel;
a second pixel different from the first pixel; and
an infrared light pixel configured to receive a second infrared light contained in ambient light;
exposing the first pixel for a first exposure duration during which the first infrared light is emitted;
exposing the second pixel for a second exposure duration during which emission of the first infrared light is stopped,
wherein the second exposure duration is longer than the first exposure duration;
obtaining an infrared light image captured by the first pixel, a visible image captured by the second pixel, and an ambient infrared light image captured by the infrared light pixel;
removing the first infrared light from the infrared light image and the visible image based on the ambient infrared light image; and
generating a final image based on the removal of the first infrared light.

11. A non-transitory computer-readable medium having stored thereon computer-executable instructions that, when executed by a processor of an imaging apparatus, cause the processor to perform operations, the operations comprising:
emitting a first infrared light, wherein
the imaging apparatus comprises a sensor array comprising a plurality of pixels,
the plurality of pixels comprises:
a first pixel;
a second pixel different from the first pixel; and
an infrared light pixel configured to receive a second infrared light contained in ambient light;
exposing the first pixel for a first exposure duration during which the first infrared light is emitted;
exposing the second pixel for a second exposure duration during which emission of the first infrared light is stopped,
wherein the second exposure duration is longer than the first exposure duration;
obtaining an infrared light image captured by the first pixel, a visible image captured by the second pixel, and an ambient infrared light image captured by the infrared light pixel;
removing the first infrared light from the infrared light image and the visible image using based on the ambient infrared light image; and
generating a final image based on the removal of the first infrared light.

* * * * *